United States Patent
Torres et al.

(10) Patent No.: US 11,275,786 B2
(45) Date of Patent: Mar. 15, 2022

(54) IMPLEMENTING ENHANCED DEVOPS PROCESS FOR COGNITIVE SEARCH SOLUTIONS

(71) Applicant: International Business Machines Corporation, Armonk, NY (US)

(72) Inventors: Javier Ricardo Torres, Miami, FL (US); Joseph Kozhaya, Wake, NC (US); Andrew R. Freed, Cary, NC (US); Corville O. Allen, Morrisville, NC (US); Shikhar Kwatra, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/386,796

(22) Filed: Apr. 17, 2019

(65) Prior Publication Data

US 2020/0334296 A1 Oct. 22, 2020

(51) Int. Cl.
*G06F 17/00* (2019.01)
*G06F 16/9032* (2019.01)
*G06F 16/906* (2019.01)
*G06F 8/73* (2018.01)

(52) U.S. Cl.
CPC .......... *G06F 16/90332* (2019.01); *G06F 8/73* (2013.01); *G06F 16/906* (2019.01)

(58) Field of Classification Search
None
See application file for complete search history.

(56) References Cited

U.S. PATENT DOCUMENTS

| | | | |
|---|---|---|---|
| 9,612,821 B2 | 4/2017 | Iyer et al. | |
| 9,760,627 B1* | 9/2017 | Bradley | G06F 40/205 |
| 9,898,258 B2 | 2/2018 | Fan | |
| 10,360,265 B1* | 7/2019 | Agarwal | G06F 16/90332 |
| 11,003,667 B1* | 5/2021 | Bakir | G06F 16/9035 |
| 2003/0115191 A1* | 6/2003 | Copperman | G06F 16/9038 |
| 2009/0112828 A1* | 4/2009 | Rozenblatt | G06F 16/3338 |

(Continued)

FOREIGN PATENT DOCUMENTS

WO WO2018233818 A1 12/2018

OTHER PUBLICATIONS

Disclosed Anonymously, A Cognitive Pattern-Based Method for Designing and Expediting Business and IT Solutions, ip.com, IPCOM000244533D, Dec. 18, 2015.

(Continued)

*Primary Examiner* — Hasanul Mobin
(74) *Attorney, Agent, or Firm* — Jamar K. Ray (57) ABSTRACT

A method and system are provided for implementing enhanced cognitive searches optimized to integrate deployment with development testing. An initial body of works is ingested into a system capable of answering questions. A series of queries is analyzed against the initial body of works utilizing a set of scorers utilizing criteria to form assessments, wherein each scorer uses the criteria against the query and the initial body of works to form the assessment. The assessments are analyzed to determine a usefulness of a set of entries in the initial body of works. Content are deployed using the identified selected first set of entries as deployment ready, enabling enhanced cognitive search results.

16 Claims, 10 Drawing Sheets

(56) References Cited

U.S. PATENT DOCUMENTS

| | | | |
|---|---|---|---|
| 2013/0066886 A1* | 3/2013 | Bagchi | G06F 16/3329 |
| | | | 707/749 |
| 2013/0152047 A1 | 6/2013 | Moorthi | |
| 2016/0171050 A1* | 6/2016 | Das | G06F 16/90332 |
| | | | 707/714 |
| 2017/0235895 A1* | 8/2017 | Cox | G06F 40/30 |
| | | | 705/2 |
| 2017/0371636 A1 | 12/2017 | Palavalli et al. | |
| 2018/0032890 A1* | 2/2018 | Podgorny | G06Q 30/016 |
| 2018/0165580 A1* | 6/2018 | Boyer | G06N 5/04 |
| 2018/0336286 A1* | 11/2018 | Shah | G06Q 10/10 |
| 2019/0138660 A1* | 5/2019 | White | G06F 16/9038 |

OTHER PUBLICATIONS

Karthik Jaganathan, Intergrating Cognitive Services into your DevOps Strategy, Brochure Aspire Systems.

Disclosed Anonymously, Agile Development Cognitive Story Point Calsulator to Recommend Score, People and Wording, ip.com, IPCOM000252151D, Dec. 19, 2017.

Disclosed Anonymously, A Cognitive System and Method for Refining Test Cases Based on the Solution, Design, Communication and Defect Tracking System, ip.com, IPCOM000254662D, Jul. 20, 2018.

\* cited by examiner

IMPLEMENTING ENHANCED DEVOPS PROCESS FOR COGNITIVE SEARCH SOLUTIONS

FIELD OF THE INVENTION

The present invention relates generally to the data processing field, and more particularly, relates to a method and system for implementing cognitive searches optimized to integrate deployment with development testing.

DESCRIPTION OF THE RELATED ART

Cognitive search capability for enterprises is provided, for example, by IBM's Watson Discovery service (WDS), where a large number of documents are uploaded, and are enriched with metadata, such as keywords, entities, relations, sentiment, and the like, and indexed. Original documents and enrichments are indexed. Users can then leverage a powerful query capability to find selected information quickly.

Currently users can improve cognitive search capability by uploading training data, such as queries, and associated relevant documents, which can improve the relevancy of retrieved results.

Currently, a problem exists related to the DevOps process associated with cognitive search capability. Users have at least a Development environment and a Production environment and where promoting updates requires exact copies of the content and the training data in both the Development and Production environments. This can be quite costly because it requires maintaining duplicate size environments. Both cost, and performance is adversely impacted as the size of the collection grows.

SUMMARY OF THE INVENTION

Principal aspects of the present invention are to provide a method and system for implementing an enhanced DevOps process for cognitive search solutions. Other important aspects of the present invention are to provide such method and system substantially without negative effects and that overcome many of the disadvantages of prior art arrangements.

In brief, a method and system are provided for implementing enhanced cognitive searches optimized to integrate deployment with development testing. An initial body of works is ingested into a system capable of answering questions. A series of queries is analyzed against the initial body of works utilizing a set of scorers utilizing criteria to form assessments, wherein each scorer uses the criteria against the query and the initial body of works to form the assessment. The assessments are analyzed to determine a usefulness of a set of entries in the initial body of works. Content are deployed using the identified selected first set of entries as deployment ready, enabling enhanced cognitive search results.

In accordance with features of the invention, an algorithm is provided to distinguish new content as one of ready for deployment and not ready for deployment.

In accordance with features of the invention, using the identified selected first set of entries as deployment ready provides the most relevant responses and optionally is based on more recent versions of a document or more complete version of a document.

In accordance with features of the invention, the DevOps process associated with cognitive searches is optimized, enabling improved relevancy of retrieved documents.

In accordance with features of the invention, the DevOps process associated with cognitive searches is optimized, without maintaining duplicate size environments for production and development documents. In addition to enabling enhanced cost, performance is enhanced by minimizing the size of the document collection.

In accordance with features of the invention, one deployment or production environment is maintained environment with all the documents to query against, add metadata fields to identify which documents are production-ready vs. development or validation. The set of scorers is run to evaluate performance against the set of production and development or validation documents, and based on the results from the scorers, decide which documents to push to production, updating respective meta-data fields, as well as assign a set of weights to promote enhanced documents for cognitive search results.

In accordance with features of the invention, scoring and evaluation of documents in different environments is used to transition documents through the DevOps pipeline.

In accordance with features of the invention, scoring of documents in each environment and moving the associations across documents enables moving a document to production.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

For example, references to "file" should be broadly considered to include and may be substituted with block, page or any other logical subdivision of data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing cognitive searches optimized to integrate deployment with development testing. A DevOps process associated with cognitive searches is optimized, enabling improved relevancy of retrieved documents. The DevOps process is optimized, without maintaining duplicate size environments for production and development documents.

It should be understood that embodiments of the present invention can be implemented in a cloud environment and in conjunction with various types of computing environments now known or later developed.

Figure 1:
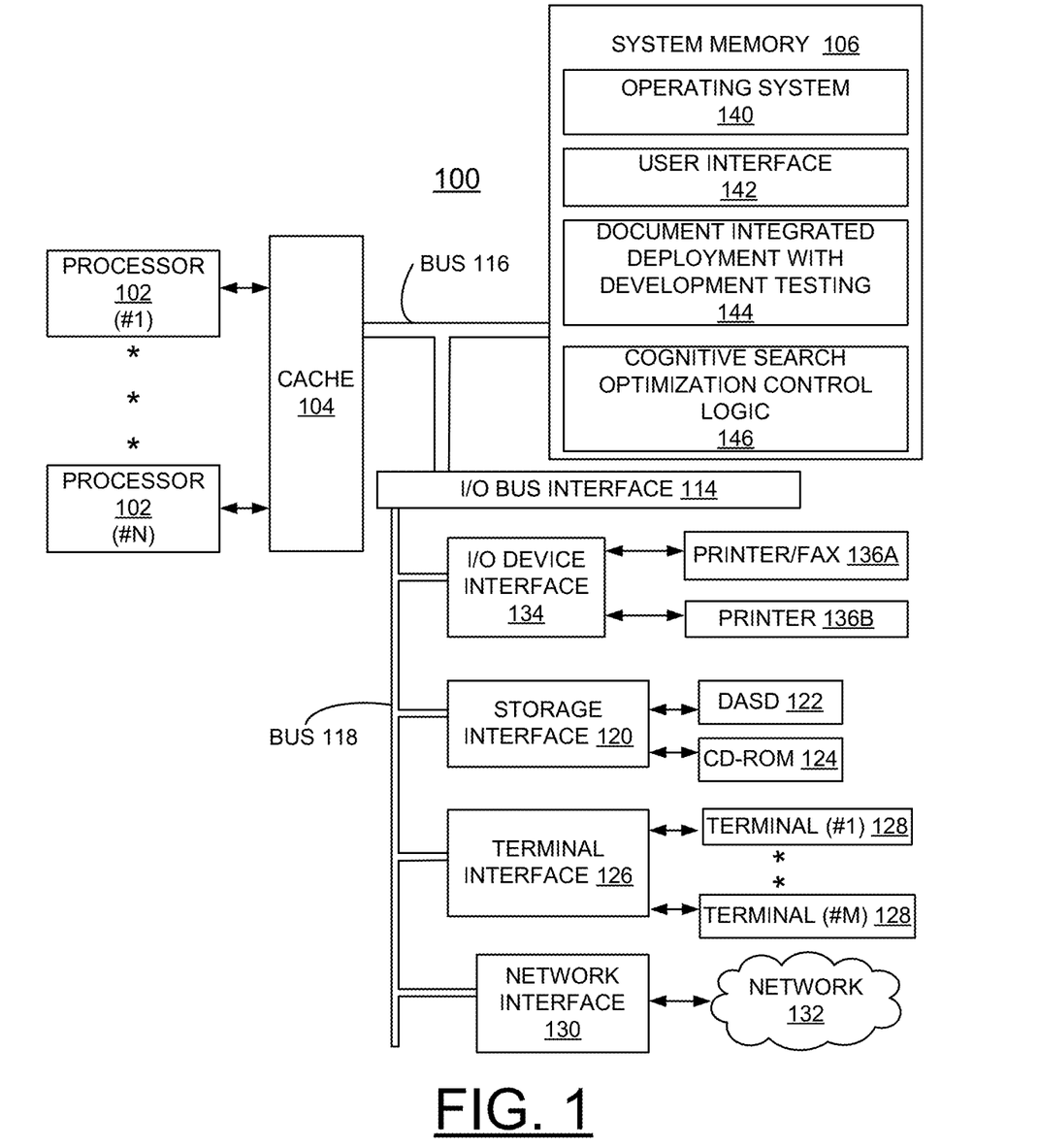
FIG. 1 is a block diagram of an example computer system for implementing enhanced cognitive searches optimized to integrate deployment with development testing in accordance with embodiments of the invention.

Having reference now to the drawings, in FIG. 1, there is shown an example computer system embodying the present invention generally designated by the reference character 100 for implementing cognitive searches methods optimized to integrate deployment with development testing in accordance with an embodiment of the invention.

Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including applications and programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), via system bus 116 and through system I/O bus 118. System I/O bus 118 is, for example, an industry standard PCI bus, or other appropriate bus technology.

System memory 106 stores an operating system 140, a user interface 142, a document integrated deployment with development testing 144 in accordance with the preferred embodiments, and a cognitive search optimization control logic 146 in accordance with the preferred embodiments.

In accordance with features of embodiments of the invention, enhanced cognitive searches are optimized to integrate deployment with development testing through the document integrated deployment with development testing 144 and cognitive search optimization control logic 146.

Figure 2:
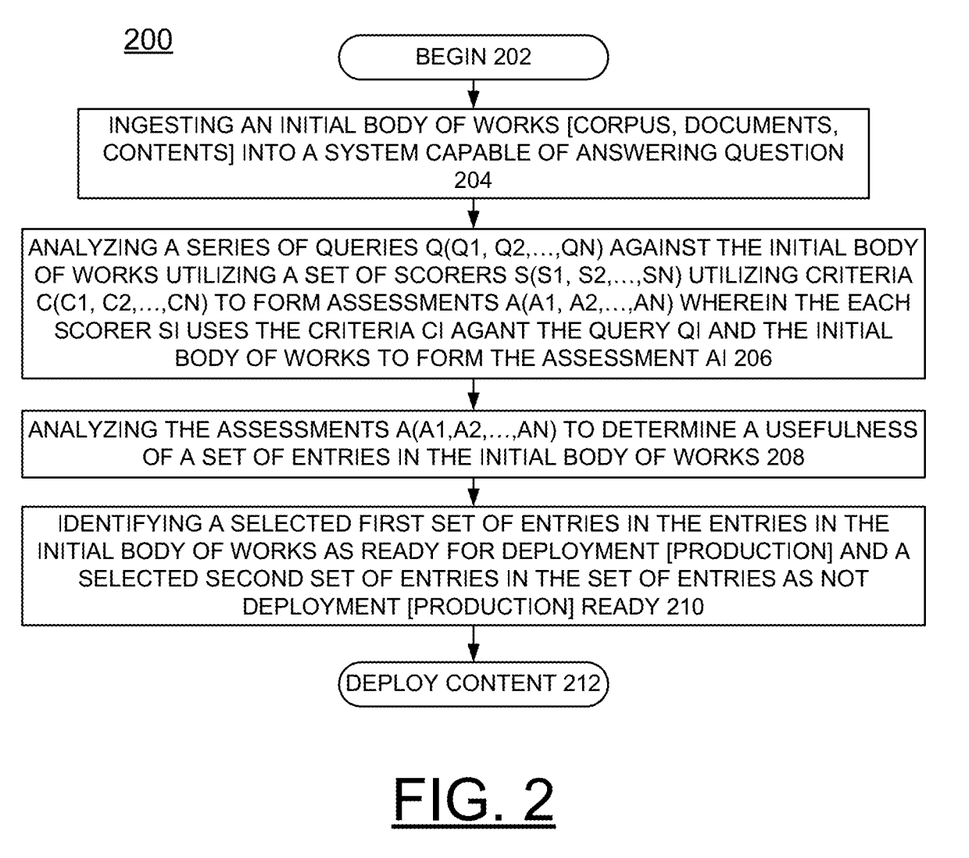
FIG. 2 is a flow charts illustrating example operations for implementing enhanced cognitive searches optimized to integrate deployment with development testing in accordance with embodiments of the invention.

Referring now to FIG. 2, there is shown a flow chart illustrating example operations generally designated by the reference character 200 for implementing enhanced cognitive searches optimized to integrate deployment with development testing in accordance with embodiments of the invention. Example operations begin as indicated at a block 202 with ingesting an initial body of works, corpus, documents, contents, into a system capable of answering questions as indicated at a block 204. Block 204 starts with an assumption of a collection of documents having a defined configuration best suited for such documents. Any difference in configuration requirements would drive different collections. Within a given collection, all documents would be ingested, enriched and indexed in a similar manner, same configuration.

As indicated at a block 206, analyzing a series of queries Q (Q1, Q2, . . . , Qm) against the initial body of works utilizing a set of scorers S (S1, S2, . . . , Sn) utilizing criteria C (C1, C2, . . . , Cn) to form assessments A (A1, A2, . . . , An) wherein the each scorer Si uses the criteria Ci against the query Qi and the initial body of works to form the assessment Ai. Assume the baseline consists of an initial set $S_N$ of N documents (baseline), and a set Q of natural language queries (common queries collected from end users). Assume the set Q of queries is a representative set of queries that can answer (provide responses to) from the specified corpus. Note that Q can be increased over time as users ask new queries. For the given set of Q queries, we assume a representative subset of such queries were trained by SMEs who have ranked most relevant responses to each query (needed for evaluation and relevancy training).

As indicated at a block 208, analyzing the assessments A (A1, A2, . . . , An) to determine a usefulness of a set of entries in the initial body of work.

At blocks 206 and 208, the sample of queries to use for evaluation can be obtained by either randomly selecting a representative sample or more intelligently identifying most representative sample by running a K-means clustering algorithm (in this case K is q) and using the central query for each cluster in sample set Q. Furthermore, to decide which documents are useful in answering queries, we need to have a mechanism for evaluating responses to queries. This requires the availability of a set of queries with associated relevant documents. One approach to obtain this information is to request subject matter experts (SME) to review queries and rank the relevance of the responses. Another approach is more automated and involves implicit evaluation by monitoring click-streams (when users click a link, it is more likely to be useful). In the following, it is assumed that either or both methods (or even other methods) are applied to generate evaluation data.

As indicated at a block 210, identifying a selected first set of entries in the entries in the initial body of works as ready for deployment or production ready and a selected second set of entries in the set of entries as not deployment or production ready.

As indicated at a block 212, content is deployed using the identified selected first set of entries as deployment ready, enabling enhanced cognitive search results.

Referring now to FIGS. 3A, 3B, 3C, and 3D respective flow charts are shown, together illustrating example operations for implementing enhanced cognitive searches optimized to integrate deployment with development testing in accordance with embodiments of the invention.

Figure 3A:
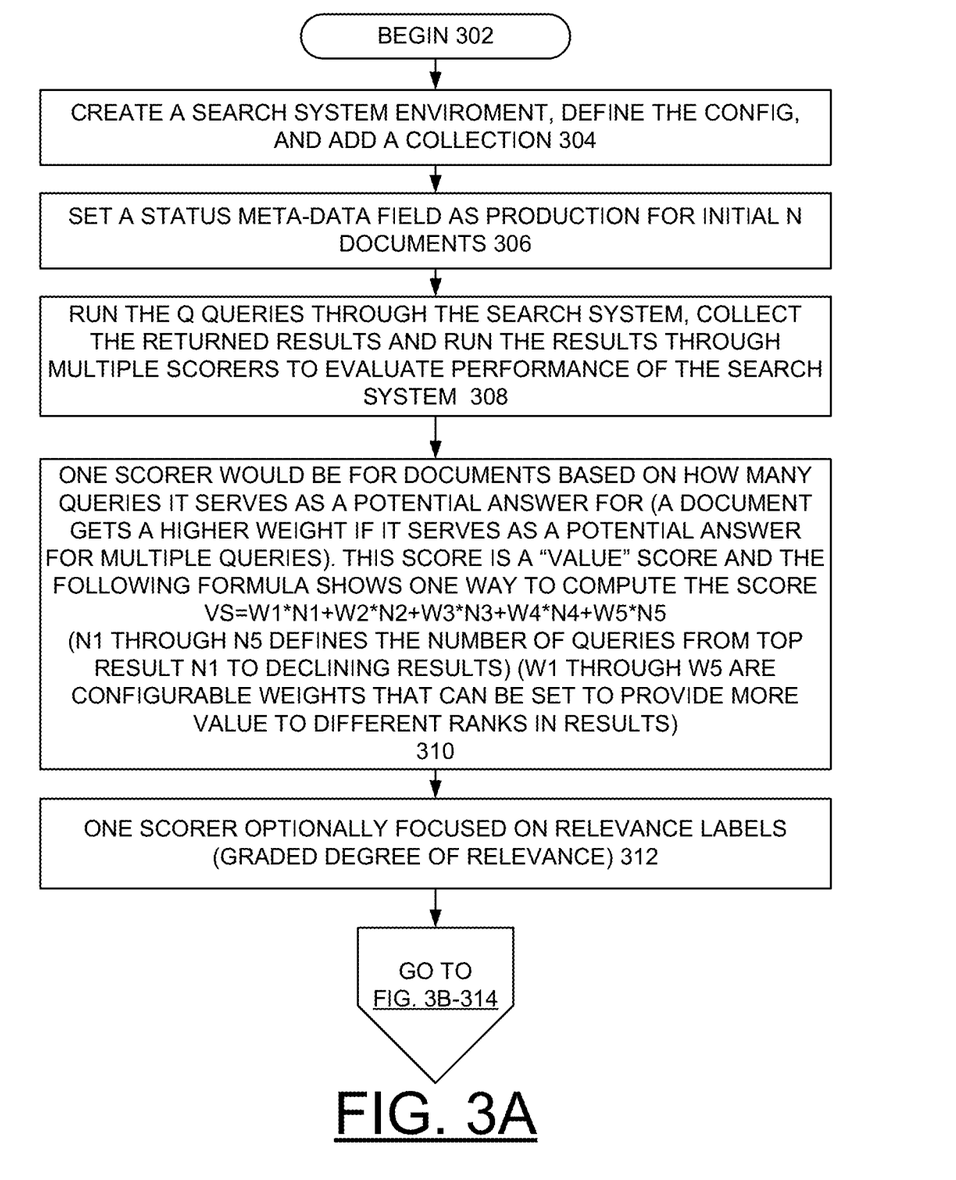
FIGS. 3A, 3B, 3C, and 3D are respective flow charts together illustrating example operations for implementing enhanced cognitive searches optimized to integrate deployment with development testing in accordance with embodiments of the invention.

In FIG. 3A, operations begin as indicated at a block 302 to incrementally add a set $S_K$ of K new documents to the corpus. As indicated at a block 304, a search system environment is created, defining the configuration, and adding a collection. As indicated at a block 306, a status meta-data field is set as production for initial N documents. Any queries against the collection would be returned from the production documents (query can be auto-augmented with a filter on the status field). As indicated at a block 308, next run the Q queries through the search system, such as IBM Watson Discovery Service, collect the returned results, and run the results through multiple scorers to evaluate performance of search system. As indicated at a block 310, One scorer would be for documents based on how many queries it serves as a potential answer for (a document gets a higher weight if it serves as a potential answer for multiple queries). We refer to this score as the value score and the set to provide more value to different rank in results. As indicated at a block 312, one scorer optionally focused on relevance labels with graded degree of relevance. Operations continue at block 314 in FIG. 3B.

Figure 3B:
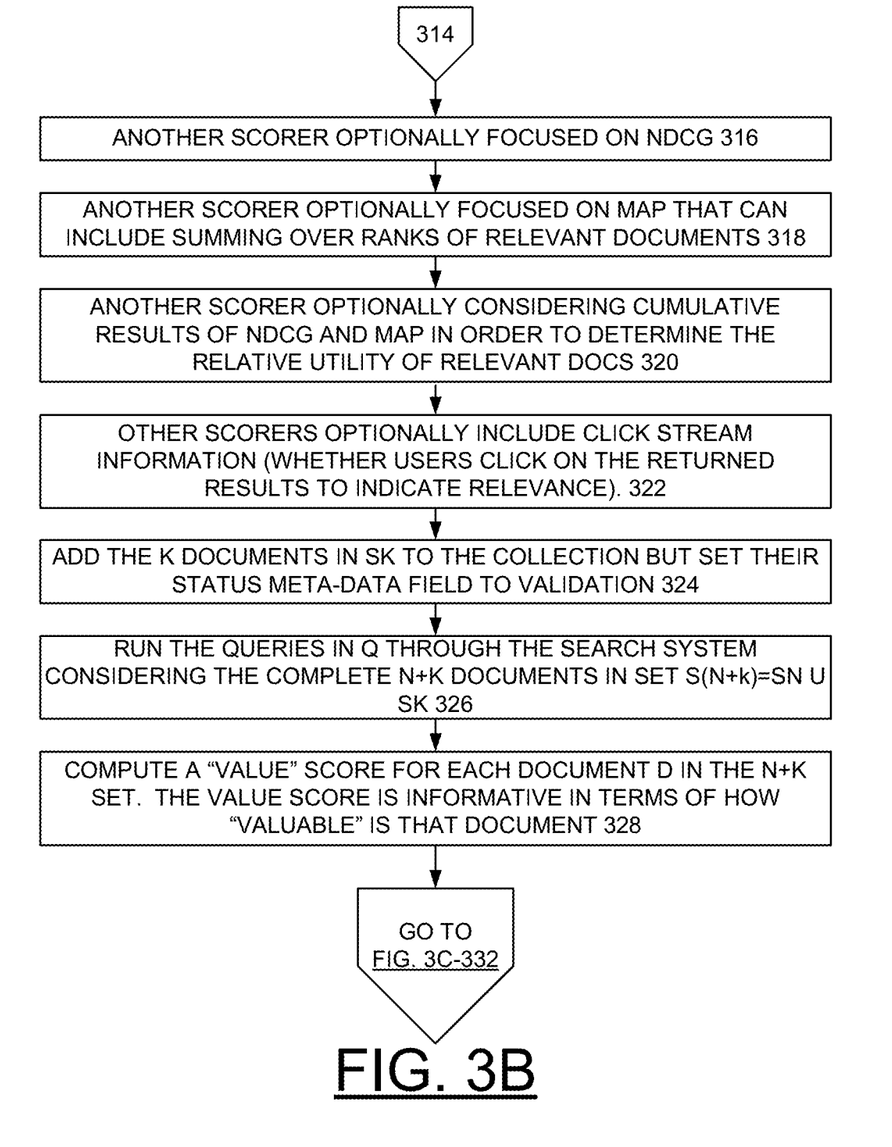

In FIG. 3B, operations following block 314, as indicated at a block 316, another scorer is optionally focused on normalized discounted cumulative gain (NDCG). As indicated at a block 318, another scorer is optionally focused on MAP or mapping component that maps documents and can include summing over ranks of relevant documents. As indicated at a block 320, another scorer optionally considers cumulative results of NDCG and MAP in considering cumulative results of NDCG and MAP in order to determine the relative utility of relevant documents. As indicated at a block 322, another scorer optionally includes click stream information, whether users click on returned results to indicate relevance.

As indicated at a block 324, next add the K documents in $S_K$ to the collection but set their status meta-data field to validation. Then as indicated at a block 326, run the queries in Q through the search system considering the complete N+K documents in set $S_{N+K}=S_N \cup S_K$. As indicated at a block 328, next compute a value score for each document d in the N+K set. The value score is informative in terms of how valuable is that document. Operations continue at block 332 in FIG. 3C.

Figure 3C:
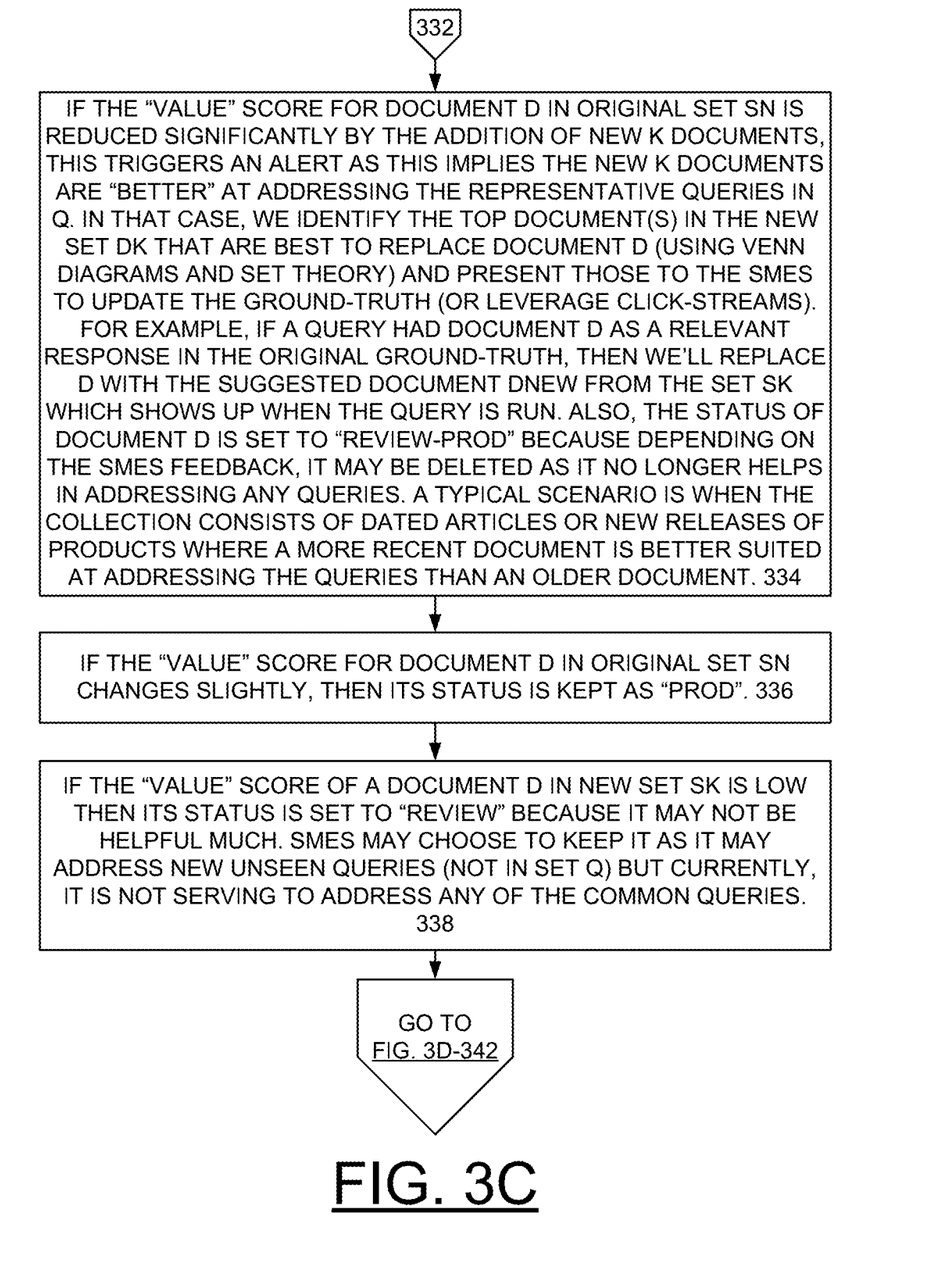

In FIG. 3C, operations following block 332, as indicated at a block 324, If the "value" score for document D in original set $S_N$ is reduced significantly by the addition of new K documents, this triggers an alert as this implies the new K documents are "better" at addressing the representative queries in Q. In that case, the top documents in the new set $D_K$ are identified that are best to replace document D, using Venn diagrams and set theory, and present those to the SMEs to update the ground-truth, or leverage clickstreams. For example, if a query had document D as a relevant response in the original ground-truth, then replace D with the suggested document Dnew from the set $S_K$ which shows up when the query is run. Also, the status of document D is set to review-production because depending on the SMEs feedback, it may be deleted as it no longer helps in addressing any queries. A typical scenario is when the collection consists of dated articles or new releases of products where a more recent document is better suited at addressing the queries than an older document.

As indicated at a block 336, next if the value score for document D in original set $S_N$ changes slightly, then its status is kept as production. As indicated at a block 338, next if the value score for document D in new set $S_K$ is low then its status is set to review because it may not be helpful. SMEs may choose to keep it as it may address new unseen queries (not in set Q) but currently, it is not serving to address any of the common queries. Operations continue at block 342 in FIG. 3D.

Figure 3D:
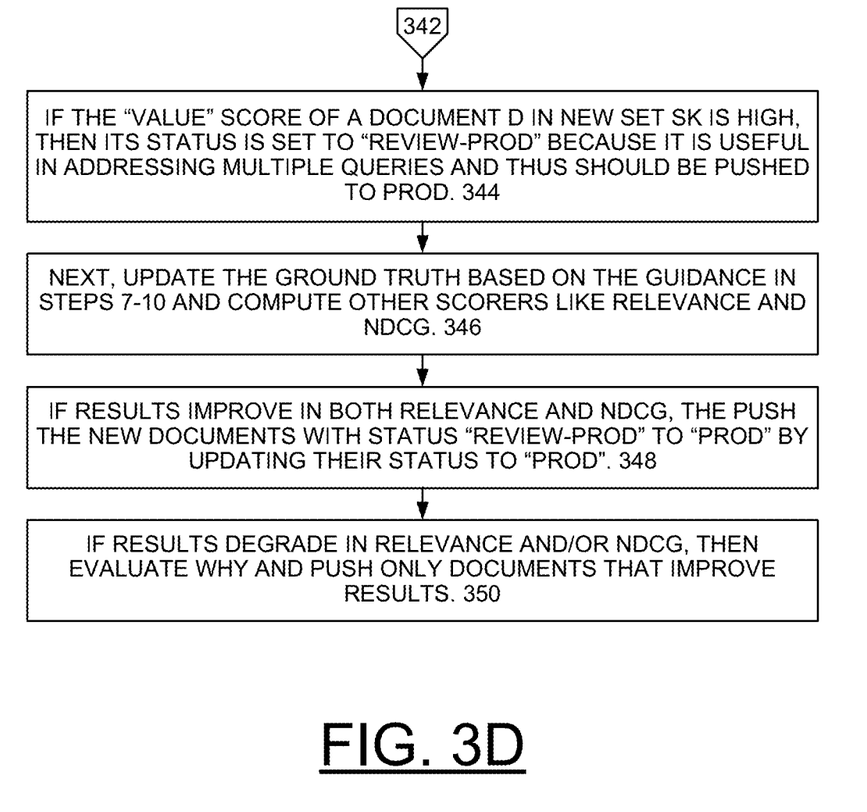

In FIG. 3D, following block 342, as indicated at a block 344, next if the value score for document D in new set $S_K$ is high, then its status is set to review-production because it is useful in addressing multiple queries and thus should be pushed to production. As indicated at a block 346, next update the ground truth based on the guidance of steps in blocks 334, 336, 338, 344 and compute other scorers like relevance and NDCG. As indicated at a block 348, if results improve in both relevance and NDCG, the push the new documents with status review-production to production by updating their status to production. As indicated at a block 350, if results degrade in relevance and/or NDCG, then evaluate why and push only documents that improve results to production.

Figure 4:
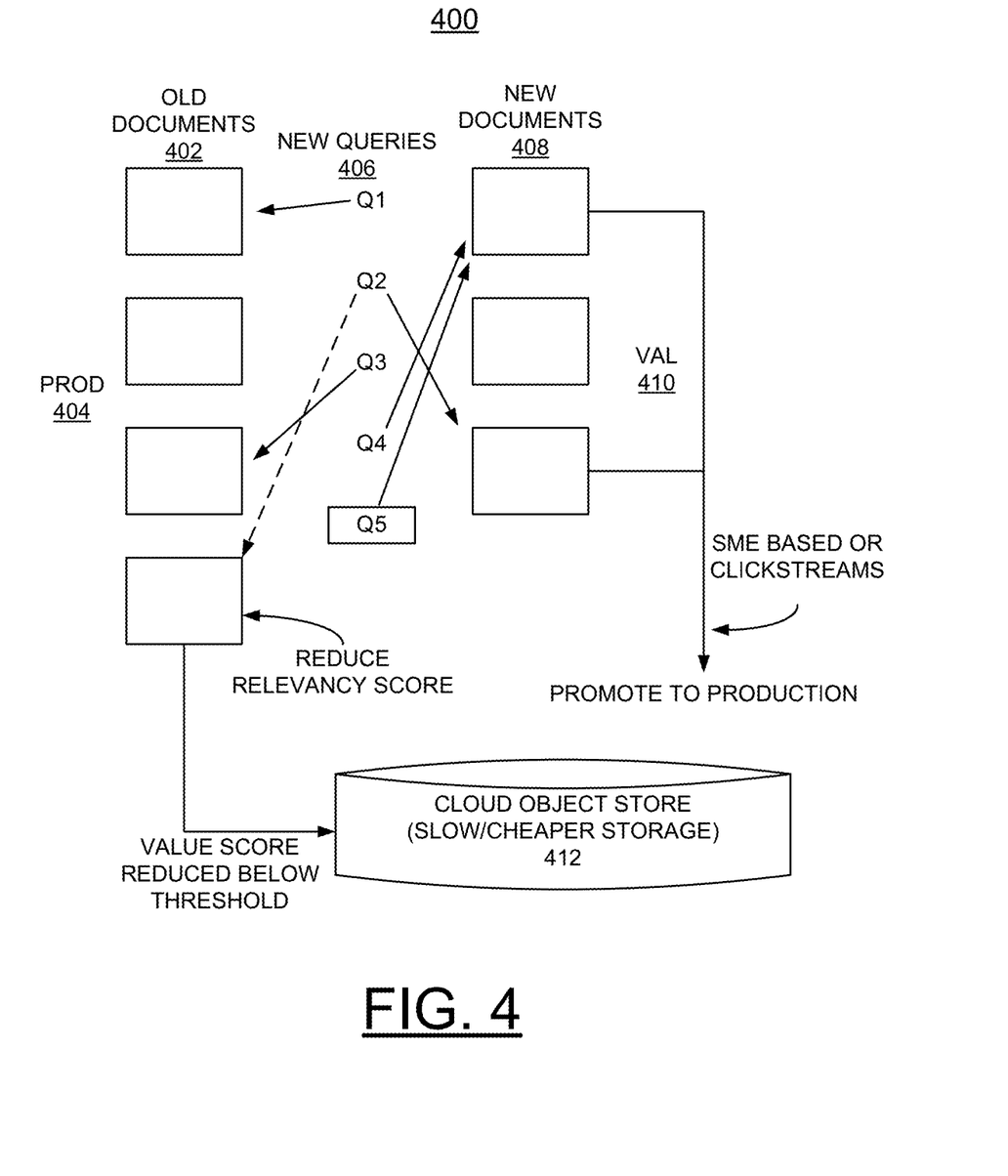
FIGS. 4 and 5 are respective flow charts illustrating example operations for implementing enhanced cognitive searches optimized to integrate deployment with development testing in accordance with embodiments of the invention.
Figure 5:
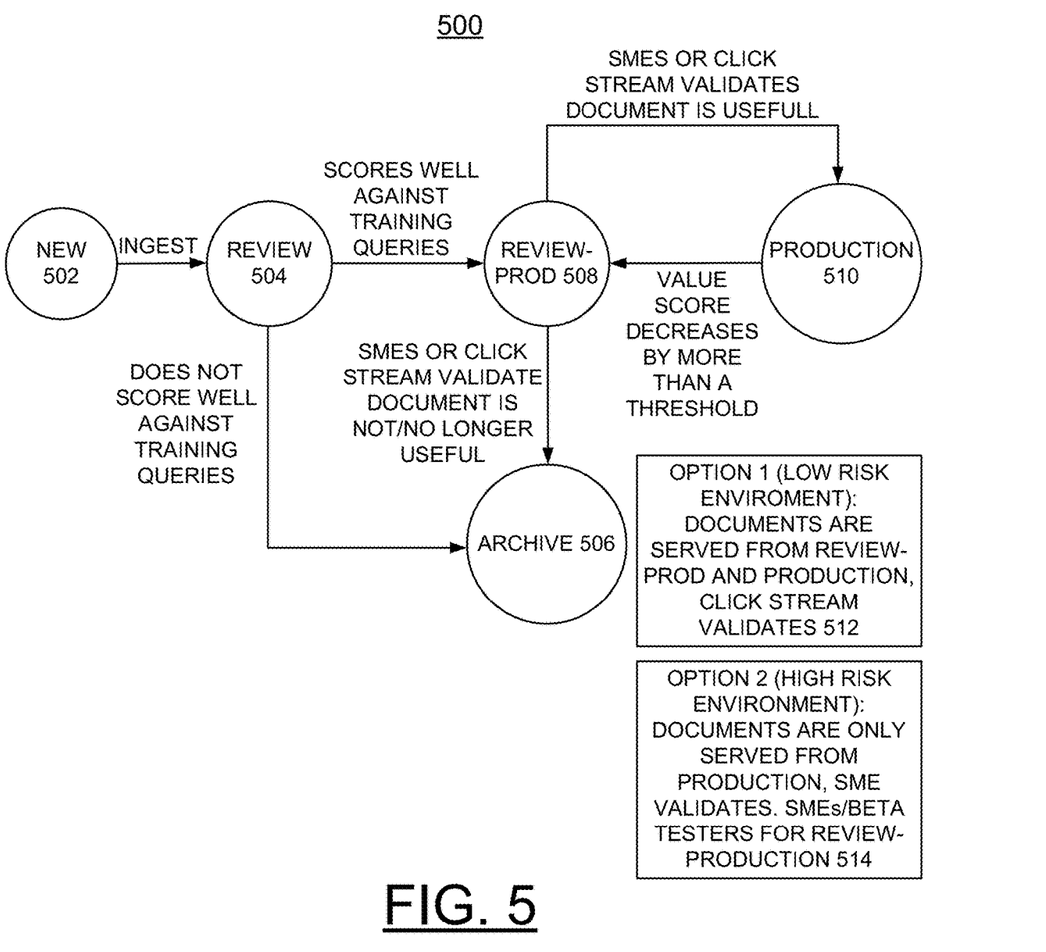

Referring now to FIGS. 4 and 5, there are respective flow charts illustrating example operations for implementing enhanced cognitive searches optimized to integrate deployment with development testing in accordance with embodiments of the invention. FIG. 4 shows how one document (last document in the old set) is archived or moved to cloud object store (COS) when the query Q2 which used to be addressed by that document is now better answered by new documents. Old documents 402 are shown with a production (Prod) 404 environment. As shown, new queries 406, Q1, Q3 are applied to old documents 402. New queries 406, Q2 are applied to old documents 402 where relevancy score is reduced, and to new documents 408 shown with a validation (Val) 404 environment. New queries 406, Q4, Q5 are applied to new documents 408. New documents 408 are promoted to production SME based or ClickStreams. Old documents 402 with a value score reduced below threshold are moved to cloud object store (COS) 412, which is slower or cheaper storage.

Referring now to FIG. 5, there is shown an example chart generally designated by the respective reference character 500 illustrating the process of FIG. 4. As shown in FIG. 5, new documents 502 are ingested assigned a review status as indicated at a block 504 and then tested against a sample of queries. If a document does not score well against training queries, then it is demoted to Archive as indicated at a block 506. If it scores well, then its status is updated to review-production as indicated at a block 508. Documents in review-production status are then validated (either via clickstream information or by SMEs) and if validated, they are pushed to production as indicated at a block 510 by updating their status to production status. If, on the other hand, these documents are not validated, then they are pushed to Archive at block 506 and eventually deleted.

In FIG. 5, two different options are outlined in deciding which documents to serve in the production environment: As indicated at a block 512, Option 1 includes Low Risk environment: For low risk environment (such as a general internal search system), the system will serve documents with both production and review-production and that is helpful because it allows us to generate click-stream data which can be used for evaluating the relevance of these documents to the queries. As indicated at a block 514, Option 2 includes High Risk environment: For high risk environment (such as external app serving business critical solutions), the system will only serve documents with production status and SMEs (or possibly beta testers) would explicitly validate the new documents.

Figure 6:
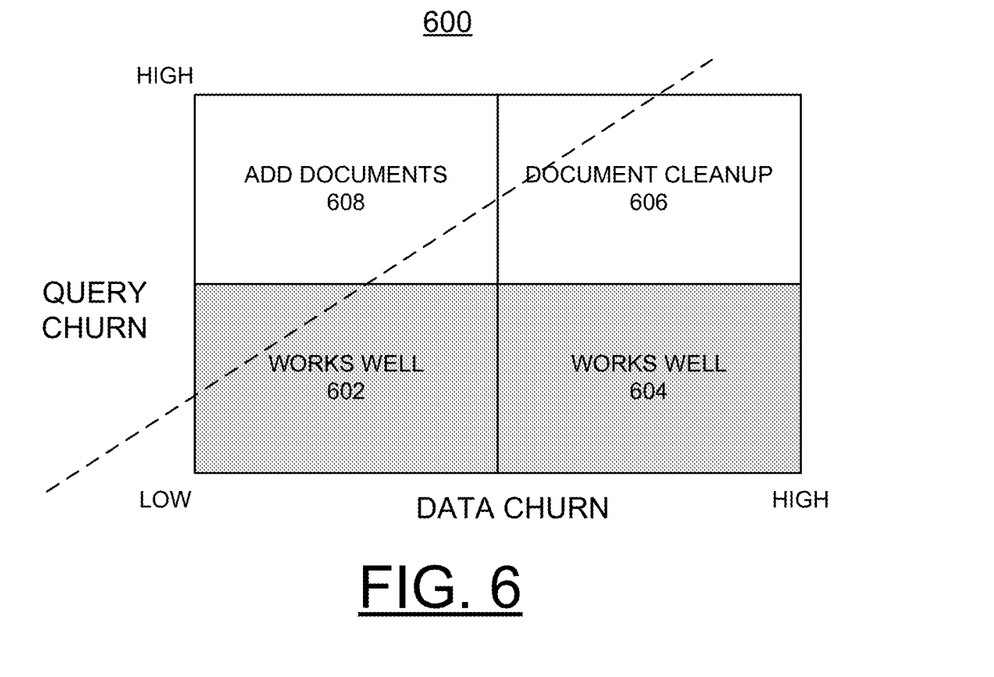
FIG. 6 is a chart illustrating example query churn versus data churn operations in accordance with embodiments of the invention.

Referring now to FIG. 6, there is shown an example chart generally designated by the respective reference character 600 illustrating example speed of variation of Data and Queries query operations with data churn shown along the horizontal axis and query churn shown along the vertical axis in accordance with embodiments of the invention. Data Churn is defined as the rate of change of the documents available to index while Query Churn is the rate of change of queries asked. The method of the preferred embodiments handles scenarios of low query churn across the range of data churn (low-high), as illustrated at WORKS WELL, 602, 604. In other words, if the queries stay relatively the same or change slowly, then the query set Q stays approximately the same and the method works well in capturing which new documents to move to production status and which existing documents to demote to review-production status and eventually move to Archive. For the case of high query churn and high data churn, as illustrated at DOCUMENT CLEANUP 606, the method reacts appropriately in removing older documents which are not being asked about any more and adding the newer documents which are asked about more. The common use case for this is News where old news become outdated quickly and it is important to keep track of newer news articles without exploding the number of articles saved. Existing systems typically end up deleting news articles older than a given date. Our method performs more intelligently in that it deletes only the articles not asked about in queries any more. The last scenario is where there is high query churn (a lot of new questions) but a low data churn (there aren't enough new documents to address the new queries), as illustrated at ADD DOCUMENT, 608. For that scenario, the only feasible solution is to add more documents to address the new queries.

In brief summary of some features of embodiments of the invention, multiple advantages include optimizing the number of documents stores and thus, the overall cost and performance of the system. Additionally, the approach helps with avoiding document duplication, which is a major concern in search systems, especially ones with an associated machine learning ranking solution. This is because when training the system, if we specify one document as relevant but a duplicate version of that document as not-relevant, this would confuse the system. With embodiments of the invention, duplicate documents are identified based on whether they address one or more same queries. Another key advantage is that the system identifies when an existing machine learning (ML) model is adequate vs. when there is a need for a new ML model training. Effectively, if the existing ML model is good for the new documents, then the relevance is found and NDCG results improve (or stay the same) when new documents are added. However, if there is a need for new features in the ranking ML model, then the relevance and NDCG results will degrade and this may trigger a need for new ground-truth binning to highlight new features possibly.

Figure 7:
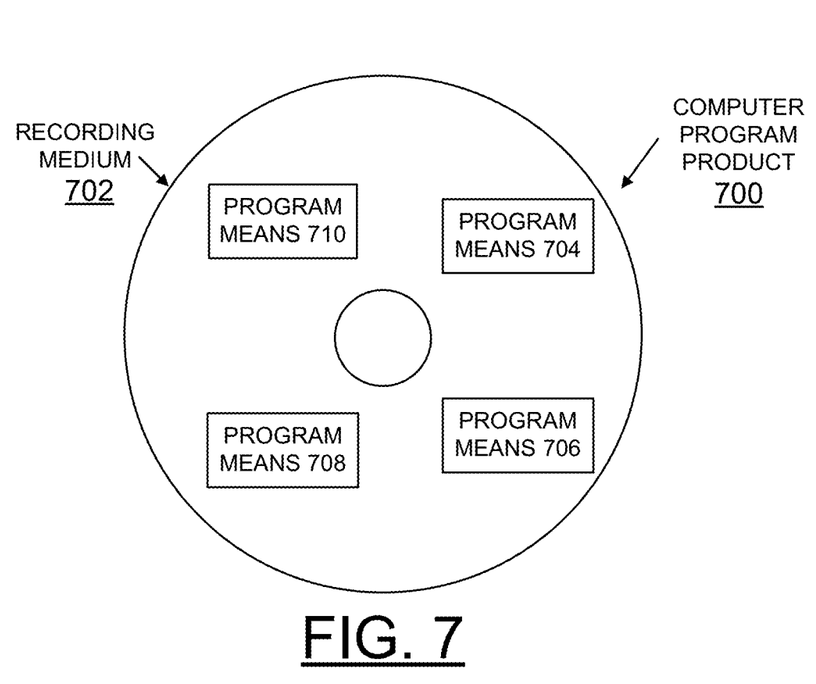
FIG. 7 is a block diagram illustrating a computer program product in accordance with an embodiment of the invention.

Referring now to FIG. 7, an article of manufacture or a computer program product 700 of the invention is illustrated. The computer program product 700 is tangibly embodied on a non-transitory computer readable storage medium that includes a recording medium 702, such as, a floppy disk, a high capacity read only memory in the form of an optically read compact disk or CD-ROM, a tape, or another similar computer program product. The computer readable storage medium 702, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 702 stores program means or instructions 704, 706, 708, and 710 on the non-transitory computer readable storage medium 702 for carrying out the methods for implementing enhanced cognitive searches optimized to integrate deployment with development testing in the system 100 of FIG. 1.

Computer readable program instructions 704, 706, 708, and 710 described herein can be downloaded to respective computing/processing devices from a computer readable storage medium or to an external computer or external storage device via a network, for example, the Internet, a local area network, a wide area network and/or a wireless network. The computer program product 700 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 704, 706, 708, and 710 from the network and forwards the computer readable program instructions for storage in a computer readable storage medium within the respective computing/processing device.

A sequence of program instructions or a logical assembly of one or more interrelated modules defined by the recorded program means 704, 706, 708, and 710, direct the system 100 for implementing enhanced cognitive searches optimized to integrate deployment with development testing of preferred embodiments.

While the present invention has been described with reference to the details of the embodiments of the invention shown in the drawing, these details are not intended to limit the scope of the invention as claimed in the appended claims.

What is claimed is:

1. A computer-implemented method comprising:
   ingesting a set of documents into a system capable of answering questions;
   analyzing a series of queries against the set of documents utilizing a set of scorers that utilize criteria to form assessments, wherein each scorer of the set of scorers forms a respective assessment;
   computing, based on the analyzing, a first value score for a first document of the set of documents, the first value score indicating a quantity of queries addressable by the first document;
   moving, based on the first value score, the first document to an archive status, the archive status indicating that the first document is not permitted to address a subsequent query;
   computing, based on the analyzing, a second value score for a second document of the set of documents, the second value score indicating a quantity of queries addressable by the second document; and moving, based on the second value score, the second document to a production status, the production status indicating that the second document is permitted to address the subsequent query.

2. The method as recited in claim 1, wherein the ingesting comprises using a uniform configuration for the set of documents.

3. The method as recited in claim 1, wherein the series of queries includes a set of natural language queries collected from end users to be answered.

4. The method as recited in claim 1, further comprising:
increasing the series of queries as end users provide new queries;
identifying a representative sample of queries by running a clustering algorithm; and
training the representative sample by ranking most relevant responses to each query of the series of queries.

5. The method as recited in claim 1, further comprising computing a value score for each document of the set of documents.

6. The method as recited in claim 1, further comprising optimizing a DevOps process associated with cognitive searches without maintaining duplicate size environments for production and development documents, and minimizing a size of document collection for the DevOps process.

7. A system comprising:
a processor;
a cognitive search optimization control logic tangibly embodied in a non-transitory machine readable medium;
said processor using said cognitive search optimization control logic to perform:
ingesting a set of documents into a system capable of answering questions;
analyzing a series of queries against the set of documents utilizing a set of scorers that utilize criteria to form assessments, wherein each scorer of the set of scorers forms a respective assessment;
computing, based on the analyzing, a first value score for a first document of the set of documents, the first value score indicating a quantity of queries addressable by the first document;
moving, based on the first value score, the first document to an archive status, the archive status indicating that the first document is not permitted to address a subsequent query;
computing, based on the analyzing, a second value score for a second document of the set of documents, the second value score indicating a quantity of queries addressable by the second document; and
moving, based on the second value score, the second document to a production status, the production status indicating that the second document is permitted to address the subsequent query.

8. The system as recited in claim 7, further comprising said processor:
optimizing a DevOps process associated with cognitive searches without maintaining duplicate size environments for production and development documents; and
minimizing a size of document collection for the DevOps process.

9. The system as recited in claim 7, wherein the ingesting comprises using a uniform configuration for the set of documents.

10. The system as recited in claim 7, wherein the series of queries includes a set of natural language queries collected from end users to be answered.

11. The system as recited in claim 7, further comprising said processor:
increasing the series of queries as end users provide new queries;
identifying a representative sample of queries by running a clustering algorithm; and
training the representative sample by ranking most relevant responses to each query of the series of queries.

12. The system as recited in claim 7, further comprising said processor computing a value score for each document of the set of documents.

13. A computer program product comprising one or more computer readable storage media, and program instructions collectively stored on the one or more computer readable storage media, the program instructions configured to cause one or more processors to perform a method comprising:
ingesting a set of documents into a system capable of answering questions, the set of documents having a uniform configuration;
analyzing a series of queries against the set of documents utilizing a set of scorers that utilize criteria to form assessments, wherein each scorer of the set of scorers forms a respective assessment;
computing, based on the analyzing, a first value score for a first document of the set of documents, the first value score indicating a quantity of queries addressable by the first document;
moving, based on the first value score, the first document to an archive status, the archive status indicating that the first document is not permitted to address a subsequent query;
computing, based on the analyzing, a second value score for a second document of the set of documents, the second value score indicating a quantity of queries addressable by the second document; and
moving, based on the second value score, the second document to a production status, the production status indicating that the second document is permitted to address the subsequent query.

14. The computer program product as recited in claim 13, wherein the series of queries includes a set of natural language queries collected from end users to be answered.

15. The computer program product as recited in claim 13, the method further comprising:
increasing the series of queries as end users provide new queries;
identifying a representative sample of queries by running a clustering algorithm; and
training the representative sample by ranking most relevant responses to each query of the series of queries.

16. The computer program product as recited in claim 13, the method further comprising computing a value score for each document of the set of documents.

* * * * *